B. A. COX.
MINNOW TRAP.
APPLICATION FILED OCT. 17, 1910.
1,005,605.
Patented Oct. 10, 1911.
2 SHEETS—SHEET 1.
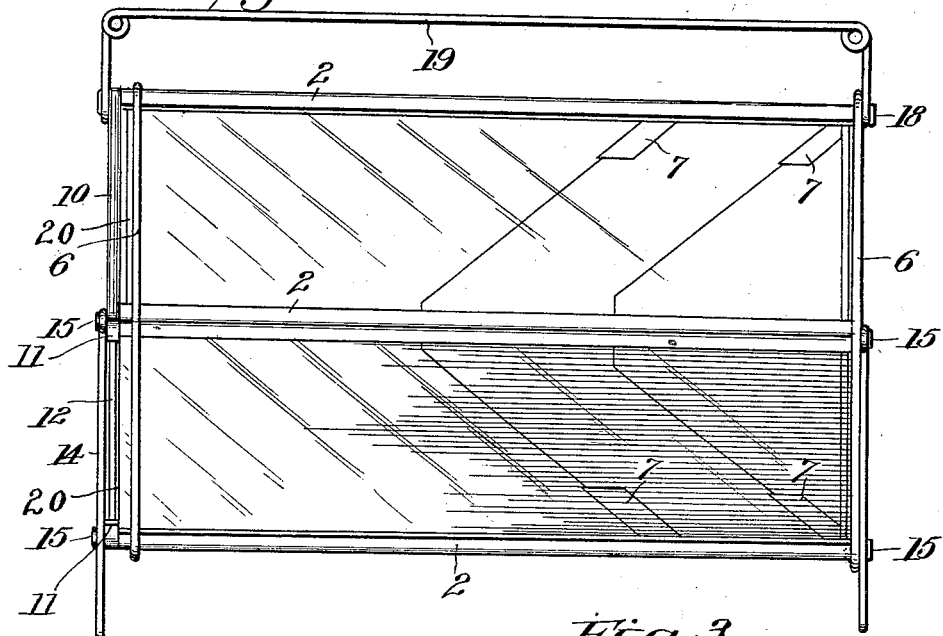
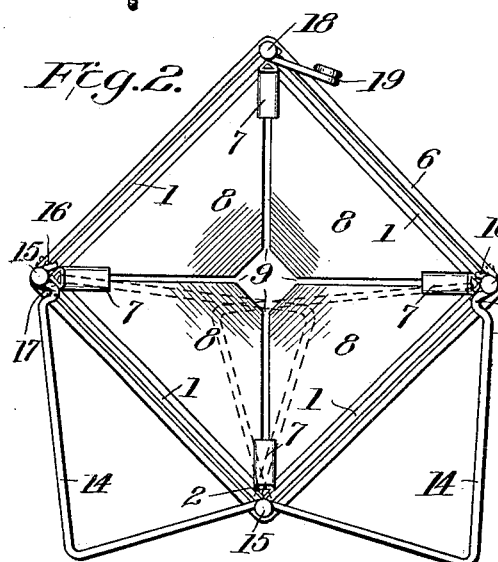
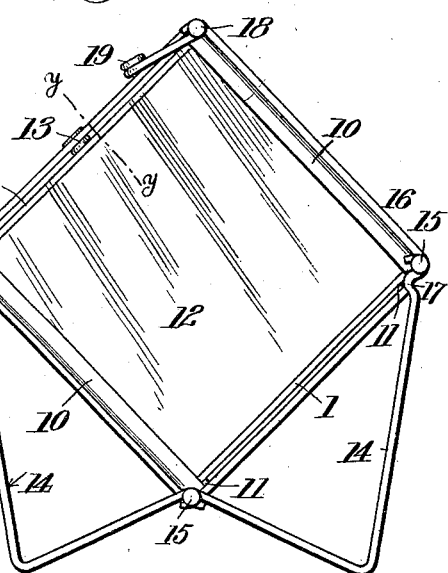
Witnesses
C. H. Walker.
Ernest F. Hutchinson.
Inventor
Bishop A. Cox,
By Edson Bro's,
Attorneys
COLUMBIA PLANOGRAPH CO., WASHINGTON, D. C.

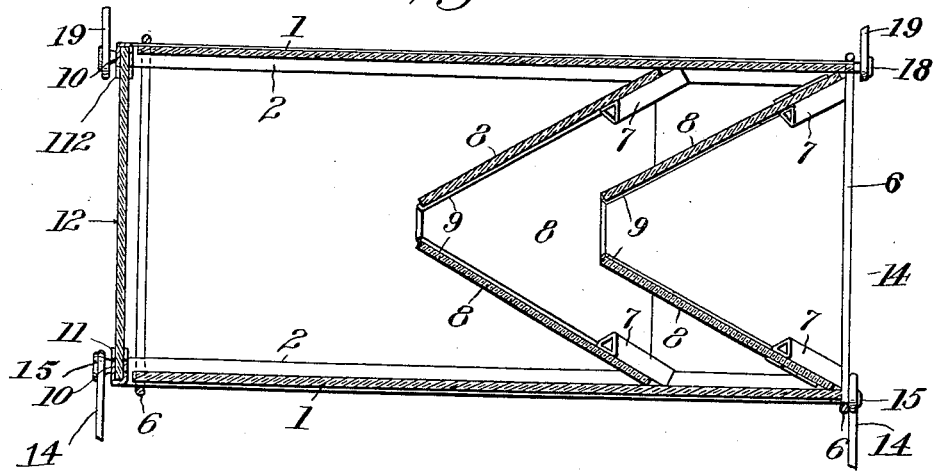
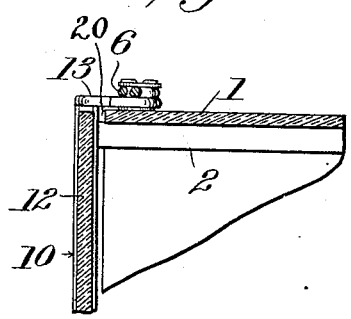
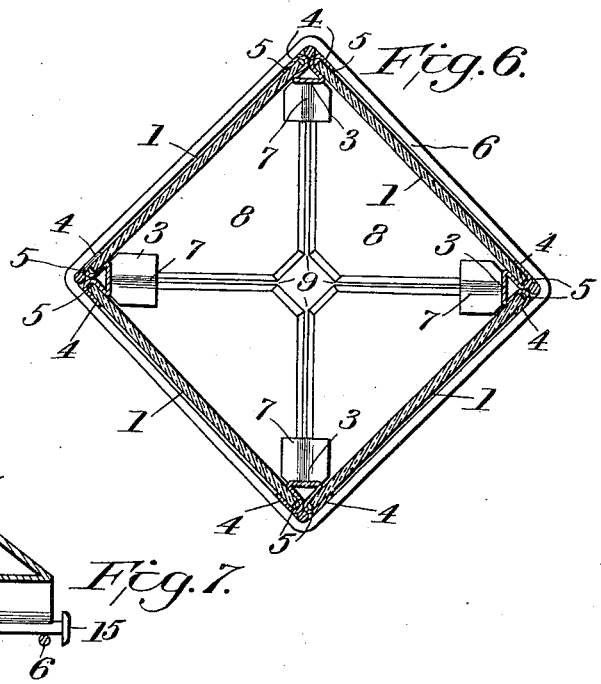
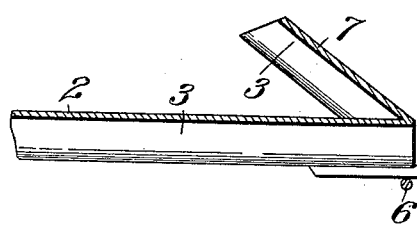

UNITED STATES PATENT OFFICE.

BISHOP A. COX, OF FAYETTEVILLE, ARKANSAS.

MINNOW-TRAP.

1,005,605.   Specification of Letters Patent.   Patented Oct. 10, 1911.

Application filed October 17, 1910. Serial No. 587,468.

*To all whom it may concern:*

Be it known that I, BISHOP A. Cox, a citizen of the United States, residing at Fayetteville, in the county of Washington and State of Arkansas, have invented certain new and useful Improvements in Minnow-Traps; and I do hereby declare the following to be a full, clear, and exact description of the invention, such as will enable others skilled in the art to which it appertains to make and use the same.

My invention relates to minnow traps.

The object of the invention is to simplify its construction, reduce the number of parts, provide against breakage in shipment, and facilitate the assemblage of the various parts.

Other objects will become apparent from the following description.

The invention consists of a novel construction of trap or inclosure made with transparent sides and an opening in the form of the frustum of a hollow pyramid projecting into the same and through which the minnows pass to reach the bait placed within said inclosure.

The invention also consists in the features of construction and combinations of parts hereinafter described and specified in the claims.

In the accompanying drawings illustrating the preferred embodiment of my invention: Figure 1 is a side elevation of the trap. Fig. 2 is a front end view thereof, the folded positions of the supports being illustrated in dotted lines. Fig. 3 is a rear view of the trap. Fig. 4 is a central longitudinal sectional view taken transversely of the channeled strips which hold the removable rear end piece or door. Fig. 5 is a broken sectional view on the line *y—y* of Fig. 3 showing the way the latch, for holding the rear door, is mounted, and also the space between the sides of the trap and said door. Fig. 6 is a cross section of the trap, and Fig. 7 is a broken longitudinal section of one of the corner strips on an enlarged scale.

Carrying out my invention, I preferably made the trap substantially square in cross section, each side being formed by a rectangular piece of glass 1 or other suitable transparent material. The preferred size of these pieces or plates of glass is twelve inches long by six inches wide so that the trap when erected will be about these dimensions.

At the lateral edges of the trap, there are metal strips 2, each being preferably made of a piece of sheet metal bent so as to form a tubular middle portion 3, preferably triangular in cross section, and flanges 4 arranged at right angles to one another and spaced away from said tubular portion so as to form the grooves 5 to receive the edges of the glass plates 1. Said strips are rigidly held in proper relative position by square frames 6 soldered or otherwise secured to the outer surfaces of the flanges of said strips. Each of said metal strips also has two similarly formed short sections 7 secured at oblique angles to the tubular portions thereof. One of said short sections is arranged near one end of said strip, while the other is spaced preferably about one-third of the distance from that end to the other end. It should be understood that all of the short sections are arranged at the same angle with their respective metal strips and that the spacing between the two short sections on each strip is the same. The function of these short sections is to hold trapezoidal pieces or plates of glass 8, four of which when placed in position form one of the entrances in the shape of the frustum of a hollow pyramid. The inner points of said trapezoidal pieces of glass are cut off to leave the opening or entrance proper. The size of the opening may be regulated by the amount which is cut off at these corners, or in other words, by the length of said trapezoidal glass plates. The lateral edges of said plates are also spaced apart, as at 9 in Fig. 2.

Two facing channeled strips 10 are secured to opposite edges of the rear end of the framework composed of the longitudinal strips and square frames. Said channeled strips are closed at one end, as at 11, in Fig. 3. Their other ends are open to permit the insertion and withdrawal of a square glass plate 12 constituting the rear door of the trap through which the minnows may be removed at will. Said plate or door is retained in its closed position by a pivoted latch 13 carried by the rear frame 6.

The trap is supported in a diagonal position by bent wire brackets 14 connected to headed pins 15 projecting from the opposite ends of the three lower longitudinal strips 2. Each of said brackets is substantially right angular in shape and has one of its ends pivotally connected to the projecting pin on the bottom strip 2. The other end of each bracket has a laterally extending hook 16 formed thereon with an inwardly extending shoulder 17 below it. The hook is adapted to engage the pin on one of the lateral strips 2. When so connected, the shoulder 17 projects over the end of one of the lower glass plates 1 and the end of the hook projects over the end of the corresponding upper glass plate 1. Said plates or transparent sides of the trap are, therefore, retained in place in the framework by the upper ends of the supporting brackets 14 when the latter are arranged in their folded position. The hooks on said bracket may be disconnected from their respective pins, folded into the position indicated in dotted lines in Fig. 2, and engaged with the opposite pins when the trap is to be shipped. The upper strip 2 also has projecting pins 18, similar to the pins 15 on the other strip. A longitudinal bail or handle 19 is pivotally connected to said pins 18 for raising and carrying the trap. Said handle may be turned down upon one side of the trap, where it is entirely out of the way, when the trap is to be packed for shipment.

From the above description, it will be seen that when the hooks on the supporting bracket at the front end of the trap are disconnected from their pins, the glass plates or sides of the trap may be easily slipped out. As soon as said sides are removed, the trapezoidal glass plates forming the entrances may also be taken out. It will be noted, however, that said entrance plates are retained in place by the side plates when the latter are inserted. It will also be observed that when the parts of the trap are assembled, there are continuous slots or openings left between the rear ends of the side plates and the door which permits the water to flow freely through the trap, while at the same time, preventing the escape of the minnows.

The interior entrance is preferably made smaller than the exterior one in order to allow the smaller minnows to pass into the rear end of the trap while the larger ones may be caught in the front compartment between the two entrances. All of the glass plates are so placed in the trap that they are not exposed beyond the outer planes of the metal parts. Said glass plates, therefore, will not come in contact with a packing case in which the trap is shipped, thus avoiding the necessity of packing with excelsior or similar material to avoid danger of breaking when roughly handled in transportation.

As generally understood by those skilled in this art, a trap of this kind is submerged with its entrance down stream and its rear end supported a little higher than the front end. Crackers or other light bait are placed between the first and second entrances in my trap and, because of the tilted position of the trap, will collect just outside of the second or interior entrance instead of at the extreme rear end of the trap as it would if the second entrance were not provided. I have found that when a minnow passes into the trap and finds himself hemmed in between the first and second entrances, he crowds through the second smaller entrance even though it is smaller and he would not voluntarily pass through it for food. The double entrance not only permits of catching larger minnows along with the small ones, but also holds them doubly secure. While the double entrance is preferable in most instances, my trap may be made with a single entrance without departing from my invention.

I claim:

1. In a trap of the character described, the combination, with a frame comprising grooved corner strips, and rigid connections between said strips, of plates fitted in the grooves in said strips and constituting the sides of the trap, and means to support said trap which also retain said plates in the grooves in said strips.

2. In a trap of the character described, the combination, with a frame comprising grooved corner strips and rigid connections between said strips, of plates fitted in the grooves in said strips, pins on the ends of said strips, supporting brackets pivoted to certain of said pins, each of said brackets having a hook formed at its other end whereby it is detachably connected to another of said pins, and shoulders on said hooks which retain the sides of the trap in place when said hooks are engaged with their respective pins.

3. In a trap of the character described, the combination, with a frame comprising grooved corner strips and rigid connections between said strips, of plates fitted in the grooves in said strips and constituting the sides of the trap, short sections of grooved strips secured to said corner strips and extending at oblique angles thereto inwardly from the corresponding end of said corner strips, triangular plates fitted in the grooves in said sections and forming an entrance to the trap, and means to support the trap comprising brackets having detachable connections with the ends of the corner strips which lock said side plates in the grooves in said strips.

4. In a trap of the character described, the combination, with a frame comprising grooved corner strips and rigid connections between said strips, of plates fitted in the grooves in said strips and constituting the sides of the trap, short sections of grooved strips secured to said corner strips and extending at oblique angles thereto inwardly from the corresponding end of said corner strips, trapezoidal plates fitted in the grooves in said sections and forming an entrance to the trap, said side plates extending beyond the outer ends of the entrance plates whereby the latter are retained in the grooves in the oblique strips when said side plates are in the grooves in the corner strips, and means to support the trap, comprising brackets having detachable connections with the ends of the corner strips which lock said side plates in the grooves in said strips.

In testimony whereof, I affix my signature, in presence of two witnesses.

BISHOP A. COX.

Witnesses:
SAM ELLIOTT,
WALTER STRICKLER.

---

Copies of this patent may be obtained for five cents each, by addressing the "Commissioner of Patents, Washington, D. C."